(12) United States Patent
Dehestru et al.

(10) Patent No.: US 11,369,916 B2
(45) Date of Patent: Jun. 28, 2022

(54) PROCESS FOR REGULATING AN OXYGEN PRODUCTION UNIT BY COMPARISON OF THE DIFFERENTIAL PRESSURES CHARACTERISTIC OF DIFFERENT ADSORBERS

(71) Applicant: L'Air Liquide, Société Anonyme pour l'Etude et l'Exploitation des Procédés Georges Claude, Paris (FR)

(72) Inventors: Marie Dehestru, Les Loges-en-Josas (FR); Christian Monereau, Champigny-sur-Marne (FR); David Bigot, Les Loges-en-Josas (FR); Clotilde Muller, Les Loges-en-Josas (FR); Jean-Claude Aiguesparses, Les Loges-en-Josas (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 222 days.

(21) Appl. No.: 16/880,599

(22) Filed: May 21, 2020

(65) Prior Publication Data
US 2020/0368671 A1    Nov. 26, 2020

(30) Foreign Application Priority Data
May 23, 2019  (FR) ...................................... 1905446

(51) Int. Cl.
*B01D 53/047*  (2006.01)
(52) U.S. Cl.
CPC .... *B01D 53/0476* (2013.01); *B01D 2253/108* (2013.01); *B01D 2256/12* (2013.01);
(Continued)

(58) Field of Classification Search
CPC .. B01D 53/04; B01D 53/047; B01D 53/0476; B01D 2253/108; B01D 2256/10;
(Continued)

(56) References Cited

U.S. PATENT DOCUMENTS 3,703,068 A * 11/1972 Wagner ................. C01B 21/045
                                                              95/98
4,168,149 A    9/1979 Armond et al.
(Continued)

FOREIGN PATENT DOCUMENTS

EP   1 114 666    7/2001
EP   1 661 596    5/2006
(Continued)

OTHER PUBLICATIONS

French Search Report for corresponding FR 1905446, dated Dec. 13, 2019.

*Primary Examiner* — Frank M Lawrence, Jr.
(74) *Attorney, Agent, or Firm* — Elwood L. Haynes

(57) ABSTRACT

A process for regulating a unit for the production of oxygen from atmospheric air comprising N adsorbers (, N being = or >2, each according to a PSA, VSA or VPSA adsorption cycle with an offset of a phase time, the regulation process including determining a value of differential pressure characteristic of a step of the adsorption cycle for each adsorber, calculating the difference between the values of differential pressures characteristic of the various adsorbers, comparing this difference with a target value and, in the event of a dissimilarity being noted, correcting by modification of the transfer of at least one oxygen-rich gas stream between adsorbers or optionally between adsorber and storage tank.

12 Claims, 3 Drawing Sheets

(52) U.S. Cl.
 CPC ............... *B01D 2257/102* (2013.01); *B01D 2259/40007* (2013.01)

(58) Field of Classification Search
 CPC ......... B01D 2256/12; B01D 2257/102; B01D 2257/104; B01D 2259/40007; C01B 13/00; C01B 21/00
 USPC ........... 95/19, 22, 96.103, 130, 148; 96/108, 96/121, 113
 See application file for complete search history.

(56) References Cited

U.S. PATENT DOCUMENTS

| | | | |
|---|---|---|---|
| 4,685,938 A | * | 8/1987 | Oliker ............... B01D 53/0454 95/25 |
| 4,725,293 A | | 2/1988 | Gunderson |
| 5,407,465 A | | 4/1995 | Schaub et al. |
| 5,529,607 A | | 6/1996 | Tan |
| 2005/0229782 A1 | | 10/2005 | Monereau et al. |
| 2006/0288867 A1 | * | 12/2006 | Herb ............... B01D 53/047 95/96 |
| 2007/0204748 A1 | * | 9/2007 | Lomax ............... B01D 53/047 96/121 |
| 2008/0110338 A1 | * | 5/2008 | Taylor ............... A61M 16/0677 95/21 |
| 2008/0302238 A1 | | 12/2008 | Drouart et al. |
| 2009/0229460 A1 | | 9/2009 | McClain et al. |
| 2013/0139690 A1 | * | 6/2013 | Ohuchi ............... B01D 53/75 96/108 |

FOREIGN PATENT DOCUMENTS

| | | | |
|---|---|---|---|
| EP | 1 517 738 | | 12/2015 |
| FR | 2 374 940 | | 7/1978 |
| JP | 10-216454 | * | 8/1998 |
| WO | WO 2006 100398 | | 9/2006 |

* cited by examiner

PROCESS FOR REGULATING AN OXYGEN PRODUCTION UNIT BY COMPARISON OF THE DIFFERENTIAL PRESSURES CHARACTERISTIC OF DIFFERENT ADSORBERS

CROSS REFERENCE TO RELATED APPLICATIONS

This application claims the benefit of priority under 35 U.S.C. § 119 (a) and (b) to French Patent Application No. 1905446, filed May 23, 2019, the entire contents of which are incorporated herein by reference.

BACKGROUND

The present invention relates to a process for regulating a unit for the production of oxygen from atmospheric air comprising adsorbers that follow a PSA, VSA or VPSA pressure cycle.

Generally, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time):

VSA processes, in which the adsorption is carried out substantially at atmospheric pressure, preferably between 0.95 and 1.25 bar abs, and the desorption pressure is less than atmospheric pressure, typically from 50 to 400 mbar abs.

Processes, in which the adsorption is carried out at a high pressure greater than atmospheric pressure, typically between 1.4 and 6 bar abs, and the desorption is carried out at a low pressure lower than atmospheric pressure, generally between 200 and 600 mbar abs.

PSA processes properly speaking, in which the high pressure is substantially greater than atmospheric pressure, typically between 3 and 50 bar abs, and the low pressure is substantially equal to or greater than atmospheric pressure, generally between 1 and 9 bar abs.

It should be noted that these various designations are not standardized and that the limits are subject to variation according to the authors.

With the preceding definitions, the invention relates both to PSA and VSA processes and to VPSA processes. It will nevertheless be noted that the majority of industrial units having a size greater than about 10 tonnes per day of oxygen are of VSA or VPSA type and that it is these to which the invention particularly relates. These units generally comprise 2 adsorbers (VPSA), 3 adsorbers (VSA) or 4 adsorbers, and optionally more, above a production of a few hundred t/d of $O_2$.

The term "adsorber" is intended to mean here the equipment which contains the adsorbent mass which describes the cycle phase after phase. It generally involves a single envelope (cylindrical with a vertical axis, with a horizontal axis, with radial circulation, etc.), but this adsorbent mass can also be housed in a plurality of modules operating in parallel and behaving as a single adsorber. The descriptions which follow relate to the general case of single adsorbers, but could be easily adapted to cases of clusters of modules.

The monitoring-controlling means of PSAs can be categorized in 3 levels.

The first relates to the regulating of the main parameters that it is desired to have the unit in question monitor, namely mainly the production pressure, the low pressure for regeneration, intermediate pressures corresponding to depressurizations and/or repressurizations, the step times, the purity, the amounts entering and/or leaving, etc.; these basic values of the process come partly from the required specifications (production rate, purity, etc.), but the others, intended to produce the most effective unit possible taking into account the industrial context, are determined during its design on the basis of experiments, of units already in service that have been returned, or increasingly of process simulation software.

The second level according to this classification will correspond to different operating modes of the nominal operation, such as reduced-operation passage (lower rate) or degraded operation passage (with fewer adsorbers operating). This type of regulation has often been added in order to improve the performance results in these cases of particular exploitation or to facilitate the work of the operator by automating interventions initially performed manually.

For example, instead of being limited to reducing production by drawing off less gas from the unit, a new regulation of the cycle that will be implemented automatically is in this case envisaged. Likewise, when the operation must be carried out with fewer adsorbers than initially intended (because of maintenance, breakdowns, etc.), a new cycle is automatically set up taking into account all the transient steps required between the nominal cycle and said new cycle. Patent EP 1 517 738 B1, which proposes the implementation of auxiliary cycles when the actual operating conditions become too different from the nominal conditions, is also part of this level.

The third level, still according to our classification, corresponds to the additional monitoring means put in place for automatically detecting and optionally correcting drifting by the unit relative to the optimal normal operation. Patent EP 978 305 B1 by the applicant, which implements the monitoring of pressures during the dead times of the cycle in order to detect leaks, typically belongs to this category. One characteristic of this level is that the actions programmed can generally be blocked without resulting in the loss of monitoring of the unit and in the forced interruption of said unit.

It will be noted that this separation of the monitoring/regulation into levels is arbitrary and that there are interactions between the various monitoring/regulation means each time they are implemented. Nevertheless, this makes it possible to better set the context of the principle of the invention, which then clearly belongs to the third of the levels that have just been defined.

For oxygen production, there are, alongside some PSA cycles, a large number of VSA or VPSA cycles which essentially differ by the arrangement of the various constituent steps. Whatever the cycle envisaged, an adsorber will begin a period of adsorption until it is saturated with $N_2$ at the high pressure and will then be regenerated by vacuum pumping, before being restored, in practice be repressurized, in order to again begin a new adsorption period. The adsorber has then completed a "pressure cycle" and the very principle of the PSA process is to link together these cycles one after the other; it is thus a cyclical process. The time which an adsorbent takes to return to its initial state is known as cycle time. In principle, each adsorber follows the same cycle with a time offset, which is known as phase time or more simply phase. It can be shown that the phase time is equal to the cycle time divided by the adsorber number.

Very generally, a cycle comprises periods of:

Production or Adsorption during which the feed gas, in this case atmospheric air, is introduced via one of the ends of the adsorber, the nitrogen is preferentially adsorbed and the oxygen-enriched gas is extracted via the second end. The adsorption can be carried out at an increasing pressure, at a substantially constant pressure or even at a slightly decreasing pressure.

Depressurization, during which a portion of the compounds present in the adsorbent and in the free spaces is released from the adsorber, which is no longer supplied with air, via at least one of the ends of said adsorber. Taking as reference the direction of circulation of the fluid in the adsorption period, it is possible to define co-current, counter-current or simultaneously co- and counter-current depressurizations.

Elution or Purge, during which an oxygen-enriched gas circulates through the bed of adsorbent in order to help in the desorption of the most adsorbable compounds, $H_2O$, $CO_2$, $N_2$. Purging is generally performed countercurrently.

Repressurization, during which the adsorber is at least partially repressurized before again starting an Adsorption period. The repressurization can be carried out countercurrentwise and/or cocurrentwise, with various streams (feed, production, streams internal to the unit).

Dead time, during which the adsorber remains in the same state. These dead times can form an integral part of the cycle, making it possible to synchronize steps between adsorbers, or form part of a step which has finished before the allotted time. The valves can then be closed or remain in the same state, depending on the characteristics of the cycle.

Depressurization and Repressurization can be carried out in different ways, especially when the unit comprises a plurality of adsorbers (or vessels). This thus leads to individual steps being defined in order to more exactly describe the gas transfers which occur between adsorbers (or vessels) and with the external environment (low-pressure waste gas, product gas, feed circuits).

Thus, the gas discharged during the depressurization period can:

Constitute a second production (at lower pressure and lower content than the main production for example).

Be used to repressurize one or more adsorbers, which are then at lower pressure; this is referred to as Equalization at decreasing pressure.

Be used as elution gas (purge gas) to help in desorbing the most adsorbable constituents from a low-pressure adsorber; this is referred to as Purge Providing.

Be discharged to the atmosphere; this is referred to as LP Decompression or Blow Down. This discharge can be carried out by means of a simple valve when the adsorber is at a pressure above atmospheric pressure or by a vacuum pump for the vacuum cycles.

Similarly, the gas received by an adsorber during repressurization thereof can originate:

Partially from the elution gas when it is carried out at increasing pressure. This step is generally still referred to as the Elution or Purge step, optionally specifying that it takes place at increasing pressure. In this case, reference will be made here to elution.

From other adsorbers performing equalizations at decreasing pressure. Reference is then made to equalizations at increasing pressure.

From the Product gas.

From the feed gas, that is to say air.

Generally, the repressurization gas is introduced via one end, the other being closed in order to retain the gas introduced in the adsorber. It is also known practice to simultaneously introduce gas via the two ends, for example air on the feed side and an oxygen-rich stream on the production side.

From these general descriptions, it will be retained that all the adsorbers follow exactly the same cycle with the offset of a phase time and must therefore in theory behave in the same way;

that there are numerous exchanges between adsorbers, and in particular that these said exchanges involve essentially oxygen-enriched gases, that is to say in practice from the outlet end of the adsorber, on the production side.

These oxygen-enriched flow rates passing from one adsorber to the other must be controlled in order to accomplish the selected pressure cycle and must be identical for all the adsorbers in order to ensure optimal operation of the production unit. To do this, a level-1 regulation according to our definition is implemented. This regulation is generally based on pressures in the adsorbers or the tanks, or on pressure differences Delta P between items of equipment. It will be noted that reference is made to complete equalization when, at the end of the step, the pressures in the 2 items of equipment are equal or virtually equal (Delta P of the order of about 10 millibar or less for example) and to incomplete equalization in the opposite case. More particularly, the gas stream transferred is regulated so that the reference pressure at the end of the step is reached after the allotted time. In practice, this corresponds to regulating either the opening of a valve, or the effective duration of a step, for example by adjusting the duration of a dead time. The modification of the opening of a valve can be carried out in several ways depending on whether it is a question of constant opening over the entire duration of the step or of opening according to a more or less complex gradient. No further information regarding the various means for regulating transfers of streams that are known to those skilled in the art and are not at the heart of the invention, which relates essentially to the rapid detection of imbalances between said transfers, will be given here.

This type of regulation is often sufficient to ensure correct operation of the oxygen production unit; nevertheless, it was possible to observe several times that, after a few weeks or a few months of operation, the initial performance results were no longer being obtained. A few hours of regulation sometimes but not always made it possible to return to said performance results. In the first case, it can be concluded that the regulation was no longer optimal although, in appearance, nothing had changed since the start-up of the unit. In the latter case, the priority should be to verify whether there is not a possible gradual pollution of the adsorbent, but a deep-seated dysregulation of the adsorber is also a plausible hypothesis.

The term "deep-seated dysregulation" is intended to mean that a slight imbalance between adsorbers in the amounts of oxygen introduced countercurrentwise has had cumulative effects over time that have caused a modification of the adsorption characteristics of at least one of the adsorbers. A return to equilibrium of said amounts of oxygen, assuming that it is possible to do so, may therefore have no apparent effect within the hours that follow. This imbalance is generally accompanied by a modification of the thermal profile in the adsorbent, which locally changes the adsorption capacities. It is known that the thermal profile in a VSA or VPSA $O_2$ takes a long time to become established and to react to a modification of the parameters. One of the most effective solutions for exiting this type of situation can be to stop the unit for 24 or 48 hours, depending on its size, so as to allow it to come back up to ambient temperature or at least to partially heat up again, and to subsequently restart.

This dysfunction linked to an imbalance between adsorbers has been identified several times and various remedies have been proposed. Each time it involves adding an operation of monitoring an additional parameter measured on both of the adsorbers and taking corrective steps as a function of these measurements, more exactly as a function of the dissimilarities between these measurements.

Thus, in order to ensure symmetrical operation between the adsorbers of a VSA or VPSA unit, and to guarantee the best possible performance results:

document U.S. Pat. No. 5,407,465 recommends monitoring the temperature in the beds of the various adsorbers, and modifying the amounts of gas transferred during the equalization, purge or oxygen recompression steps by adjusting the openings of the valves to correct the temperature dissimilarities in the various beds. This solution is advantageous since it takes into consideration a parameter, the temperature within the bed, which is effectively representative of the different streams in circulation and thereby of the imbalances. It has the drawback that the thermal environment within the adsorbent is not immediate and that the warning of the presence of an imbalance will take time. More of a problem is the fact that, while this proposal makes it possible to detect a dissymmetry, it does not make it possible to know what step is responsible for this, nor to accurately estimate the correction to be introduced. It measures a consequence of an imbalance and not the cause;

document U.S. Pat. No. 5,529,607 recommends monitoring the purity of the gas taken at the outlet of the adsorbers during the purge step, and adjusting the amount of purge gas introduced into each adsorber to correct the dissimilarities in purity measured;

document EP 1 114 666 proposes a relatively similar idea, itself also based on monitoring the purity of the desorbed gas, with correction of the equalization and purge steps to have the minimum O2 purity in the desorbed gas identical between the various adsorbers The latter solutions require having a suitable analysis system with the maintenance and calibrations accordingly required. They demonstrate a dissymmetry, but here again the step responsible is not really determined.

From there, a problem which arises is that of providing an improved process for regulating a unit for the production of oxygen from atmospheric air comprising at least two adsorbers A and B which follow a pressure cycle of VSA or VPSA type; in other words, a process which makes it possible to rapidly detect an imbalance between adsorbers and to know the cause of said imbalance.

SUMMARY

A solution of the present invention is a process for regulating a unit for the production of oxygen from atmospheric air comprising N adsorbers (1, i, N), N being = or >2, each following a PSA, VSA or VPSA adsorption cycle, with an offset of a phase time, said regulation process comprising the following steps:

a) for each adsorber (i), during at least one step of the adsorption cycle chosen from equalization, feed elution, or repressurization, continuously measuring the differential pressure between at least two points chosen between the inlet and the outlet of the adsorber, the measurement points being identical for each of the N adsorbers;

b) determining at least one value of differential pressure characteristic of the step chosen in step a) which is chosen from the differential pressures measured in step a) or a function of those pressures;

c) calculating the difference(s) (DPi-DPj) between the values of the characteristic differential pressure determined for each of the adsorbers in step b);

d) comparing this of these differences (Dpi-DPj) relative to the corresponding target value(s) (DPi-DPj)°; and e) in the event of a dissimilarity between the value of this or these differences and the target values, correcting a parameter of the cycle of at least one adsorber in order to modify the transfer of at least one oxygen-rich gas stream between adsorbers or optionally between adsorber and storage tank in such a way as to eliminate said difference.

The process according to the invention thus makes it possible to detect an imbalance between the adsorbers and to correct this imbalance. It should be noted that the term "imbalance" is intended to mean an imbalance in the amounts of gas exchanged.

It should be noted here that while measuring a flow rate may appear to be self-evident when the aim is to equilibrate amounts of gas exchanged, in practice this solution is not very suitable in the case that is the subject of attention here, and is not used. Indeed, in the overall cost of the oxygen, partly because the starting material is free, the proportion which is down to energy is predominant. This energy is consumed by the machines: vacuum pump and blower. It is therefore out of the question in practice to add a differential pressure device element to one of the circuits that counts towards the determination of this energy. The avoiding of additional energy consumption can therefore lead to the addition of items of equipment, such as for example a circuit and a valve dedicated to $O_2$ repressurization, on which circuit a calibrated orifice intended for measuring this flow rate would be installed. It would then be possible to avoid creating an additional pressure drop on the oxygen production circuit normally used in the opposite direction for the repressurization step.

A differential pressure device element might not have an impact on steps such as the elution for which the pressure upstream of the regulation valve is substantially higher (approximately 1 bar abs) than the downstream pressure (approximately 0.5 bar abs) throughout the step, but since this valve is also used for other steps, for example an equalization, any local restriction of through-passage would lead, in order to maintain certain step durations, to increasing the through-diameters of the pipes and of the valve, in order to compensate. What is more, the flow rate measurements require straight lengths of pipe upstream and downstream of the measuring member. Such a constraint would make more complex the skid of valves and pipes and would increase the cost accordingly, in addition to the effect of the additional items of equipment alone.

The case measured thus far is that of measuring flow rate by differential pressure (diaphragm, venturi, nozzle, etc.) since they are inexpensive and easy to use. There are many other types of flowmeters, such as turbines, ultrasound, thermal, vortex, Coriolis effects, etc., systems, but these are more complex processes, some of which are not very suitable for the specific conditions encountered on PSAs (streams variable in terms of pressure, of velocity, batchwise streams, etc.).

It should also be noted that it is not sought here to determine a flow rate, but only to be sure that the gas exchanges are equilibrated. The measurement of a characteristic pressure drop, outside any official standards, may be used.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
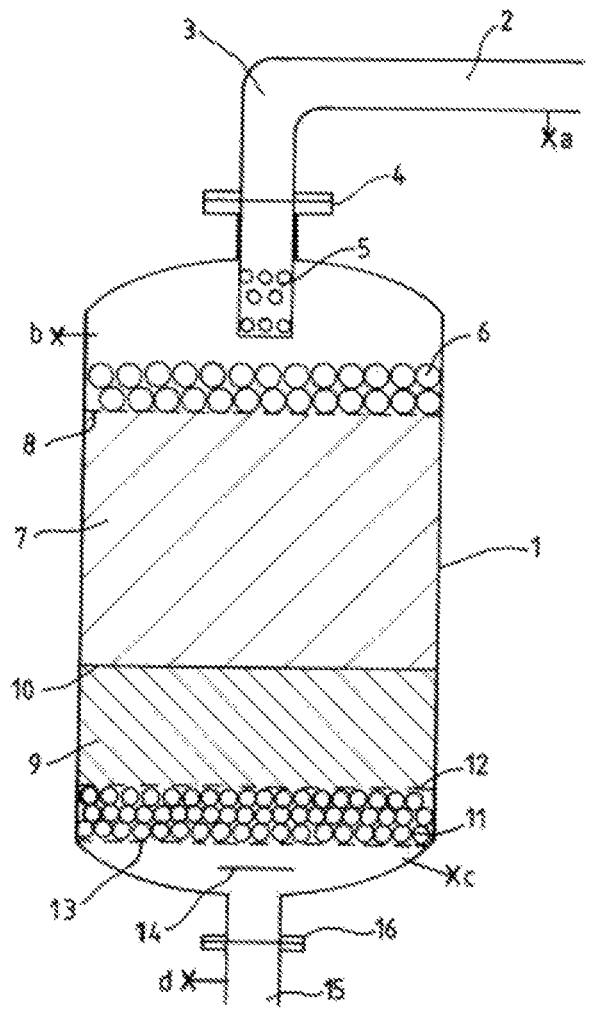
FIG. 1 illustrates schematically the basic elements of the adsorber, in accordance with one embodiment of the present invention.

The process according to the invention uses, for this purpose, the pressure drops naturally created by the fluid circulating through at least one portion of the constituent elements of the adsorber. FIG. 1 illustrates, on an example, what should be understood by constituent elements of the adsorber. It involves a cylindrical adsorber with a vertical axis 1 commonly used in PSA, VSA or VPSA processes. Assuming a circulation of the fluid from the top to the lower portion, which can be isolated in the case of a repressurization, this fluid will pass through a series of elements that will cause a pressure variation (pressure drop due to friction, singular pressure drop, etc.). A tube 2, a bend 3, a flange 4, an upper distributor 5, a bed of inert steel balls 6 serving to maintain the beds in order to avoid attrition, a first bed of adsorbent 7 which could be a lithium-exchanged zeolite, a separation grid 8 for preventing the inert balls of high density from passing through the adsorbent, a second bed of adsorbent 9 which could be doped alumina, a separation mesh 10 between the adsorbents, a layer of inert particles 11 serving as a support for the adsorbents and improving the gas distribution, a separation grid 12 for preventing the adsorbent from passing through the layer of particles having a generally higher diameter, a perforated support plate 13 holding all the materials of the envelope in place, a deflector 14, a tube 15 and an outlet flange 16 have been shown.

There may of course be additional elements (filter, etc.) or fewer elements (layer of maintaining balls, etc.) depending on the proportions of the adsorbers, the essential thing being to show here that the elements that will be used in the context of the invention have a function in the process (distribution, maintaining, adsorption, etc.) other, a priori, than a measurement of flow rate.

In the case of a cylindrical adsorber with a vertical axis or a radial adsorber, these constituent elements would be present again, but in a different configuration.

The term "oxygen-enriched gas" is intended to mean the streams extracted from the adsorber via the production side during the cycle. They are much richer in oxygen than air, exceeding 50% $O_2$ and more generally 75% or 80% $O_2$. These contents depend on the cycles used and can substantially vary.

Depending on the case, the process according to the invention may have one or more of the features below:
the value of the differential pressure characteristic of the step during which it is measured is the instantaneous value of the differential pressure at the given time of the step, the mean of measurements carried out over at least one portion of the step, the maximum value recorded over at least one portion of the step or more generally a function of the different values of the differential pressures recorded over at least one portion of the step;
N is between 2 and 4;
each adsorber comprises at least one adsorbent bed and the two measurement points are chosen between the inlet and the outlet of the adsorber, or the inlet of the adsorber and the inlet in the bed of adsorbent, or the inlet in the bed of adsorbent and the outlet of the bed of adsorbent, or the outlet of the bed of adsorbent and the outlet of the adsorber;
in step e), the parameter modified in order to correct the transfer of an oxygen-rich gas stream is chosen from a pressure setpoint—or a pressure difference setpoint—at the end of the step, and/or the opening of at least one valve, the duration of a step, the addition, the elimination or the modification of a dead time;
in step a), the step of the adsorption cycle chosen is a step of equalization at decreasing pressure;
the target value(s) are equal to zero;
the target value(s) are determined beforehand and correspond to the values for which the best degree of recovery of oxygen at the required purity is obtained;
in step a), sensors of which the maximum scale is at most 200 millibar, for example ranges from −100 millibar to +100 millibar, are used;
at least steps a) to e) of the regulation process are carried out automatically;
after step e), steps a) to e) are repeated at each new cycle of the adsorbers or at each N' cycles, with N' preferably between 2 and 2000.

In the case where, in order to obtain a uniform distribution of the streams, while at the same time limiting to the maximum the dead volumes detrimental to the obtaining of optimal performance results, it was necessary to install a distributor in the adsorber, the pressure drop around this item of equipment can serve as a basis for comparison. A measurement of differential pressure between the inlet of the adsorber and the inlet in the bed (between points a and b of FIG. 1) will then generally be retained. This measurement will then integrate a piece of pipe, a bend, the inlet in the adsorber, and the gas distribution system.

The differential pressure through the beds (b, c) can be used with some precautions to take into account any possible initial dissimilarities (bed height, adsorbent compaction, etc.). This point will be returned to later.

It is also possible to take as reference the differential pressure between the inlet and the outlet of the adsorber (a, d).

Reference is made here to inlet and outlet of the adsorber. These terms are all relative since, in the vast majority of adsorption-mediated gas separation units, the various fluids circulate in both directions. In the context of the invention, the direction of circulation has no importance per se. An oxygen-enriched stream will leave an adsorber cocurrentwise with respect to the production (therefore a priori via the outlet of the adsorber) and will enter the other adsorber via the top and countercurrentwise (therefore a priori also via the outlet of the adsorber). The terms inlet and outlet are just used to differentiate the two ends of the adsorber.

It should be noted that the differential pressures measured will preferably be greater than or equal to 15 mbar, preferably greater than or equal to 25 mbar, more preferably of the order of at least 50 mbar.

With the current measuring means, it will be possible to obtain tens of differential pressure values during a single step. A characteristic value for said step, which is representative of the stream transferred and can serve as the basis for reliable comparison, should be selected. The choice will depend on the cycle selected for the separation process. The simplest method is to select an instantaneous value at a given time of the step, for example halfway through the step. It is possible to select a mean of the values measured over the entire step or over a portion of the step only, assuming for example that the very first measurements are in a period that is not too transient. It is also possible to select the maximum value or a mean of the N maximum values recorded, with N=5 for example. Since the pressure drop varies as a first approximation as the square of the flow rate, means can be calculated from the square roots of the differential pressures. The model selected will obviously be the same for all the adsorbers.

In the process according to the invention, the difference Delta DP between the DP(i)s of the adsorbers, as defined previously, is measured over time, these differences Delta DP are compared with predetermined reference values and, in the event of a dissimilarity between measured difference and expected difference, at least one oxygen-enriched gas stream is modified on at least one of the adsorbers.

It is not therefore the value per se of the differential pressures alone that is used, but also preferably the dissimilarity between these measurements (Delta DP) from one adsorber to the other. Thus, with the terms selected, attention will be given to monitoring, in addition to the DP(i)s, the values of DP(j)-DP(k), j and k representing the number of adsorbers. The fear might be that there would be a large number of data to manage, but in practice, the vast majority of PSA or VPSA $O_2$ cycles comprise 2 adsorbers (1 and 2) and DP (1)-DP (2) will for example be monitored. In the case of VSA comprising 3 adsorbers, it will be possible to monitor DP (1)-DP(2) and DP(2)-DP(3).

A variation in these dissimilarities will signify a priori an imbalance that has occurred between the flow rates implemented. For example, on a VPSA $O_2$ unit, while the dissimilarity was thus far zero, a dissimilarity of 3 mbar between the adsorbers is seen to emerge during the initial step, said dissimilarity continuing to manifest itself, or even to widen, over the course of the cycles. Comparison of the differential pressures measured with those expected or measured previously makes it possible, a priori, to determine whether it is necessary to increase the stream coming from the adsorber A or to decrease the stream from the adsorber B in order to eliminate the dissimilarity observed. As was described previously, this modification may be carried out according to the cycle and the regulation mode retained by changing a setpoint, by adjusting the opening of a valve or by adjusting a duration.

According to the cycle used, the value of the reference pressure differential may be a constant regardless of the operating conditions, in particular regardless of the production flow rate. Conversely, if for example the duration of the step in question is extended at reduced flow rate, the flow rate of oxygen-enriched gas injected is lower, in this case the elution gas, and the corresponding differential pressure will as a result also be lower. Variations in the differential pressures of each adsorber compared with the nominal case may then be noted, but if the cycle is well regulated, the difference between these differential pressures will remain zero. Indeed, DP (1) and DP (2) will move together and their difference, in this case, will remain unchanged. Monitoring the dissimilarity between the adsorbers, DP (1)-DP (2), is a good indicator that is relatively entirely independent of the operating parameters.

In the case of VSAs which for their part generally comprise 3 adsorbers (1, 2 and 3), monitoring, as already stated, of for example DP (1)-DP (2), DP (2)-DP (3) and optionally DP (3)-DP (1) will be carried out.

According to another essential feature of the invention, the reference values of the dissimilarities in differential pressure DP(i) between adsorbers are either equal to zero, or preferably determined during regulation of the oxygen production unit at the end of optimization, at nominal flow rate or else preferably at several flow rates characteristic of the use of said unit. Given the power of monitoring/control software, the search for the optimal operation of the unit can be carried out automatically, for example during a period of time reserved for this purpose, following the start-up of the unit. It will thus be possible to determine, for example, that the optimum of the cycle is obtained for a value Delta P that is not zero but equal to +3 mbar at nominal flow rate. It is this value that will then serve as reference (target value).

These indications may be an aid to the operator to warn him that an imbalance is in the process of occurring and to give him indications as to the correction to be made (closing or opening such and such valve during such and such step on such and such adsorber). Preferably, the measurement of the differential pressures, the determination of the characteristic differential pressure DP (for example the maximum value of the pressure drop), the calculation of the dissimilarities between the characteristic pressure differentials of the adsorbers (for example DP(1)-DP(2)), the comparison with the target values corresponding to the unit operating conditions and the adjustment of the setpoints, of the regulation of the valve(s) controlling the oxygen-enriched gas flow rate, or of the step durations, are performed automatically. It is possible to decide to manually validate the intended corrections, but in any event, the processing of the data will be preferably automated.

It should be noted here that the gradual drift of the dissimilarity of the DPs, and the need to modify the setpoint of a valve several times in order to correct this drift, is also an indicator that allows the operator to diagnose a change of behavior of the valve, and therefore probably early wear. It is necessary to capitalize on this type of information and to process it because this can make it possible to carry out preventive maintenance and to thus avoid a more serious incident that the system recommended herein might no longer be able to manage.

The example intended to illustrate the principle of the invention corresponds to a VPSA cycle with two adsorbers comprising successively:

an oxygen production step a second oxygen production step during which a portion of the oxygen produced is used as elution gas a first cocurrentwise decompression step during which the gas from the adsorber is also used as elution gas a second decompression step corresponding to a step of repressurization of the other adsorber a vacuum-pumping step at the end of which the two elution gases already mentioned are successively introduced a repressurization step corresponding to the second decompression step previously mentioned a final recompression step with air.

The unit comprises the first-level regulation operations that were mentioned at the beginning, namely in practice that all the pressures at the step end are monitored. Given the fact that a cycle is involved, this means that the pressures at the step beginning are also monitored. Some of these regulation operations are carried out through regulating the opening of the valves associated with the cycle, others are carried out, when the final pressure depends on a machine (blower, vacuum pump) through the duration of the steps, by adjusting a dead time. Other means are also used as required (variable speed, bypass at the level of the machine, etc.). Other first-level regulation loops are generally used (adsorber inlet temperature, oxygen purity, production flow rate, etc.), but do not have a direct effect on the pressures.

A first third-level monitoring corresponds in practice to superimposing the successive pressure cycles (P as a function of cycle time) and to detecting any dissimilarities from one phase to the other. That consists more specifically in comparing the pressure of the adsorber 1 to the pressure of the adsorber 2, taking the same time origin, for example the beginning of the production phase. The pressure on each of the adsorbers is obviously taken at the same position, preferably at the adsorber inlet and/or outlet. This method will be returned to during the comparison with the solution according to the invention. It may be noted that this method can be easily automated, and that it makes it possible to determine the step during which a dissimilarity between the adsorbers appears and, by comparison with the preceding cycles, which of the two adsorbers has moved away from the nominal conditions and in which direction.

This method is very efficient for immediately detecting a problem on a valve opening too much or not enough, but has its limits, as will be shown, when there is only a slight imbalance that will possibly bring about however, after a certain cycle number, a detrimental loss of performance results While the monitoring of the production purity is, according to our classification, first-level monitoring, the periodic monitoring of the oxygen content at the outlet of each adsorber is third-level monitoring. It is known that the oxygen content at the outlet of an adsorber fluctuates and that the oxygen production for virtually all VPSA cycles with 2 adsorbers is not continuous. For these reasons, an $O_2$ production tank is associated with the adsorbers and is an integral part of the VPSA unit. The production purity is measured at the tank outlet and thus reflects a mean content.

The comparison of the instantaneous contents at the outlet of each of the adsorbers thus provides additional information on the relative operation thereof. There are generally no corrective actions taken automatically on the basis of these analyses, but it is a means of knowing whether an action taken elsewhere is going in the right direction (the purities move closer together) or not (the dissimilarity between the purities widens).

Figure 2:
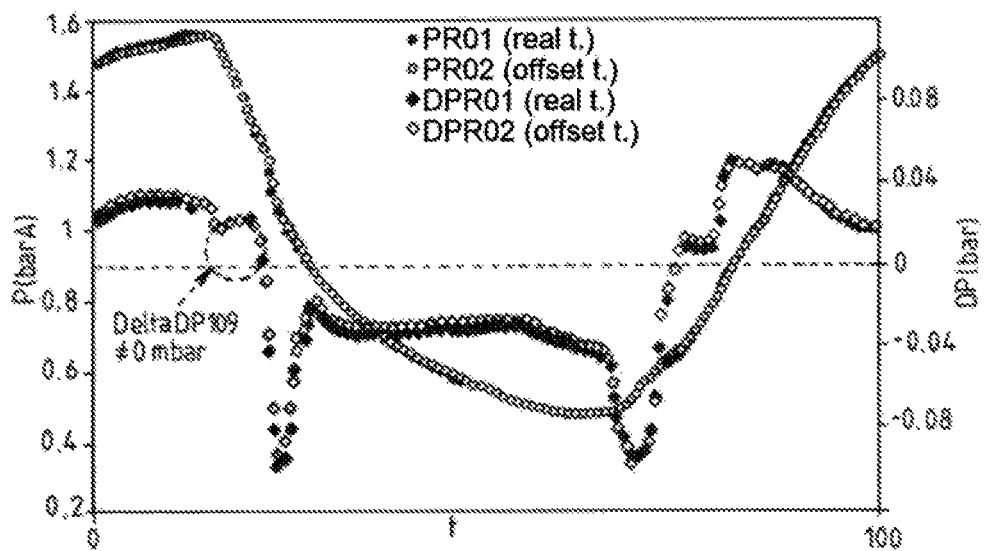
FIG. 2 illustrates schematically the pressure difference, over time, for the two adsorbers in one operating mode, in accordance with one embodiment of the present invention.

In the context of the invention, as for the pressure over time, the differential pressure was processed so as to superimpose the curves obtained for each of the adsorbers. Since the unit was regulated beforehand, no significant differences are observed between the two adsorbers, whether for the cycle pressure or for the differential pressure. FIG. 2 which is a reproduction of the recordings made illustrates this point. Along the x-axis is the standardized time, 100 corresponding to the cycle time, along the y-axis on the left-hand scale is the cycle pressure from 0.2 to 1.6 bar abs, and on the right-hand scale is the pressure differential (+100/−100 mbar). The phase time for this type of unit is between 10 and 20 seconds. The recording of the pressure P and of the differential pressure DP of the adsorber R01 has just been finished. The beginning of the recording corresponds to the beginning of the first production step. During the cycle (t from 0 to 100), each point recorded for the pressure of R01 is compared to the equivalent point of the cycle performed by the adsorber R02. The same is true for the differential pressures DP of R01 and R02.

A first point that may be noted is that the variation in pressure in the adsorber is rapid (>0.1 bar/s) in a majority of steps, whereas the frequency of acquisition of an industrial system is generally at best about a hundred milliseconds. As regards the pressure sensors, they are also items of industrial measurement equipment that have their own uncertainty. As a result of all this, there is an uncertainty with regard to the relative position of the points representing the pressure of the adsorbers. A few millibar of dissimilarity between the pressure of the adsorber 1 and the adsorber 2 taken at the same moment of the cycle but a later phase time are not significant and cannot be definitely associated with a beginning of imbalance. The unit can operate in this way, despite this apparent dissimilarity, for weeks without notable consequence.

Interest will be focused here more particularly on the first decompression following the end of the production. It is a very short step of a few seconds, during which one adsorber will send a large amount of oxygen to the second adsorber. It should in fact be known that the net production of oxygen leaving an adsorber represents less than half the total oxygen stream emitted during the various cocurrentwise steps. Among the streams other than production, the first decompression corresponds to the most significant stream at least in the case of the cycle used. A dissimilarity with regard to this stream will inevitably result in an imbalance in oxygen balances between adsorbers that, after a certain amount of time, will result in loss of purity at constant production flow rate or in a decrease in production flow rate in the presence of a regulation operation regarding the oxygen content.

The dissimilarity between the differential pressures is called Delta DP 109 in this figure and also in those that follow.

Figure 3:
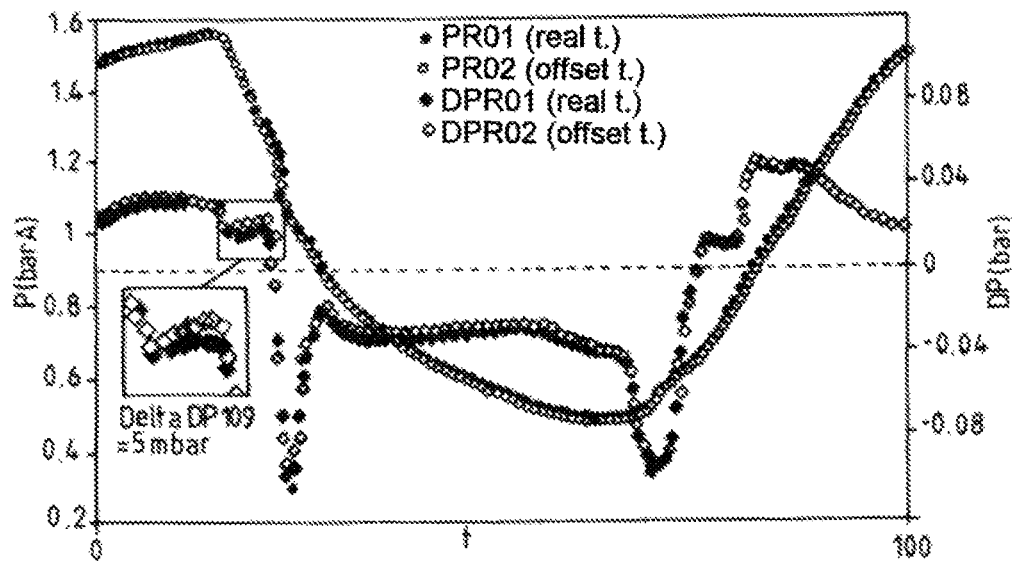
FIG. 3 illustrates schematically the pressure difference, over time, for the two adsorbers in a different operating mode, in accordance with one embodiment of the present invention.

FIG. 3 corresponds to a subsequent point of operation during which a dissimilarity with regard to the pressure differentials has clearly appeared (of the order of 5 mbar) during this first cocurrentwise decompression step. The monitoring of the pressure in the adsorbers continues to not show any significant difference. Such operation of the unit led however to a not insignificant loss of performance result. At constant flow rate, the initially 93% $O_2$ production content moved closer to around 90%. This is equivalent to a decrease of the order of 5% of the production flow rate if it had been desired to preserve the content.

It should be noted that, in the case of the measurement of the differential pressure, a −100/+100 millibar sensor which is much more precise than the pressure sensor of which the scale ranges from 0 to 2 bar abs is used, as stated above. Furthermore, over the course of steps of interest, like the first decompression on which interest is focused, the simultaneous change in the transferred flow rate and in the pressure upstream in the adsorber results in the pressure differential varying relatively little between the beginning and the end of this step. Over the course of the step in question, the variation is less than 5 mbar. Overall, a much greater precision is obtained and, in this case, a dissimilarity of a few millibar is easily revealed and effectively representative of an imbalance between adsorbers.

Following these observations, series of tests were carried out while intentionally modifying the regulation of the valve regulating the first decompression after the unit was optimized. At constant production flow rate, the purity was measured as a function of the maximum dissimilarity observed between the differential pressures of the two adsorbers, namely DP(1)-DP(2).

Figure 5:
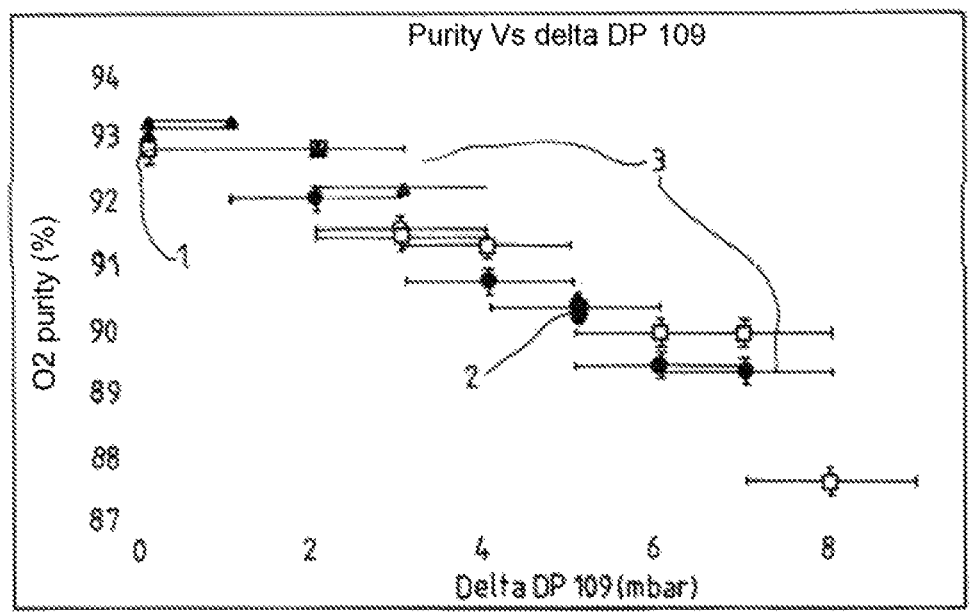
FIG. 5 illustrates schematically the purity versus the pressure difference, in accordance with one embodiment of the present invention.

A first-approximation, linear, repeating curve was obtained until a purity of 90% was reached, said phenomenon then appearing to worsen if the imbalance increases further as represented in FIG. 5. The reference point (1) is the initial regulation point, the point (2) is the point of operation during which a decrease in performance results, pressure curves that are apparently well equilibrated, and a dissimilarity regarding the differential pressures during the step of first decompression are simultaneously noted. The points (3) correspond to intentional imbalances created by closing by a few percent the valve regulating the decompression flow rate.

It was noted, subsequent to these tests, that a slight imbalance of the order of −2 to −3 mbar, that is to say on the other side of the zone explored, made it possible to improve the performance results and to exceed 93.5% purity. This justifies the fact that it is recommended to provide for an optimization phase, as mentioned at the beginning of the document, and not to be limited to wanting to regulate a zero dissimilarity. One of the potential causes is that the packing density, the respective heights of the various adsorbents used are not necessarily identical from one adsorber to the other. For that, it may be preferable to measure the differential pressure through a member that can be easily calibrated. Using a distributor, such as that of reference (5) of FIG. 1, may be a good compromise.

Figure 4:
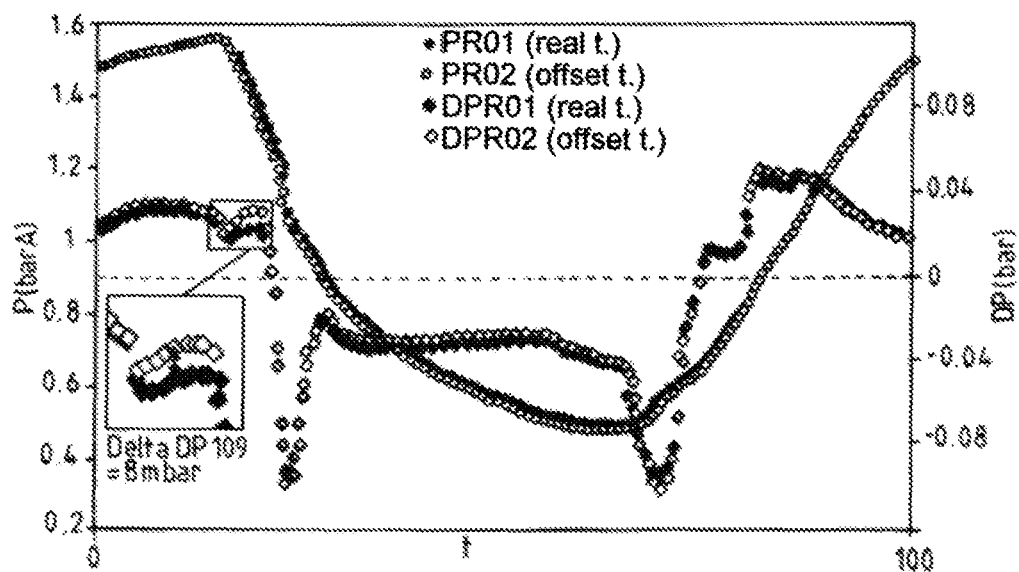
FIG. 4 illustrates schematically the pressure difference, over time, for the two adsorbers in a different operating mode, in accordance with one embodiment of the present invention.

FIG. 4 illustrates just the fact that, with a sizeable imbalance (8 mbar), the monitoring of the pressures in the two adsorbers is of little use. The superposition of these pressures during these same tests does not in fact particularly attract attention. With this sole criterion, the conclusion would have been that the operation of the unit was equilibrated with respect to the two adsorbers and that it was necessary to look elsewhere for the cause of the decrease in performance results. Such a conclusion can have significant consequences for the exploitation of the unit (halting in order to search for contamination of the sieve for example).

Finally, another subject of the present invention is a unit for the production of oxygen from atmospheric air comprising at least two adsorbers A and B which follow a VSA or VPSA pressure cycle and comprising means for regulating the unit according to the invention.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for regulating a unit for the production of oxygen from atmospheric air comprising N adsorbers, N being = or >2, each following a PSA, VSA or VPSA adsorption cycle, with an offset of a phase time, said regulation process comprising the following steps:
    a) continuously measuring the differential pressure between at least two points chosen between the inlet and the outlet of the adsorber for each adsorber (i), during at least one step of the adsorption cycle chosen from equalization, feed elution, or repressurization, the measurement points being identical for each of the N adsorbers;
    b) determining at least one value of differential pressure characteristic of the step chosen in step a) which is chosen from the differential pressures measured in step a) or a function of those pressures;
    c) calculating the difference(s) between the values of the characteristic differential pressure determined for each of the adsorbers in step b);
    d) comparing this or these differences relative to a corresponding target value(s); and
    e) correcting a parameter of the cycle of at least one adsorber in order to modify the transfer of at least one oxygen-rich gas stream between adsorbers or optionally between adsorber and storage tank in such a way as to eliminate said difference, in the event of a dissimilarity between the value of this or of these differences and the target values.

2. The process according to claim 1, wherein the value of the differential pressure characteristic of the step wherein it is measured is the instantaneous value of the differential pressure at the given time of the step, the mean of measurements carried out over at least one portion of the step, the maximum value recorded over at least one portion of the step or more generally a function of the different values of the differential pressures recorded over at least one portion of the step.

3. The process according to claim 1, wherein N is between 2 and 4.

4. The process according to claim 1, wherein each adsorber comprises at least one adsorbent bed and the two measurement points are chosen between:
    the inlet and the outlet of the adsorber,
    the inlet of the adsorber and the inlet in the bed of adsorbent,
    the inlet in the bed of adsorbent and the outlet of the bed of adsorbent, or
    the outlet of the bed of adsorbent and the outlet of the adsorber.

5. The process according to claim 1, wherein, in step e), the parameter modified in order to correct the transfer of an oxygen-rich gas stream is chosen from a pressure setpoint—or a pressure difference setpoint—at the end of the step, and/or the opening of at least one valve, the duration of a step, the addition, the elimination or the modification of a dead time.

6. The process according to claim 1, wherein, in step a), the step of the adsorption cycle chosen is a step of equalization at decreasing pressure.

7. The process according to claim 1, wherein the target value(s) are equal to zero.

8. The process according to claim 1, wherein the target value(s) are determined beforehand and correspond to the values for which the best degree of recovery of oxygen at the required purity is obtained.

9. The process according to claim 1, wherein, in step a), sensors of which the maximum scale is at most 200 millibar are used.

10. The process according to claim 1, wherein at least steps a) to e) of the regulation process are carried out automatically.

11. The process according to claim 1, wherein, after step e), steps a) to e) are repeated at each new cycle of the adsorbers or at each N' cycles.

12. A unit for the production of oxygen from atmospheric air comprising at least two adsorbers A and B which follow a PSA, VSA or VPSA pressure cycle and comprising means for implementing the process for regulating the unit according to claim 1.

* * * * *